3,232,823
PROCESS OF CONVERTING HYDROPHILIC CELLULOSE GRAFT COPOLYMERS TO HYDROPHOBIC COPOLYMERS

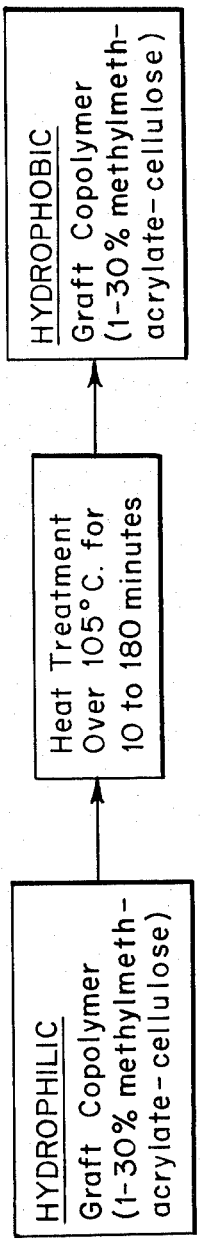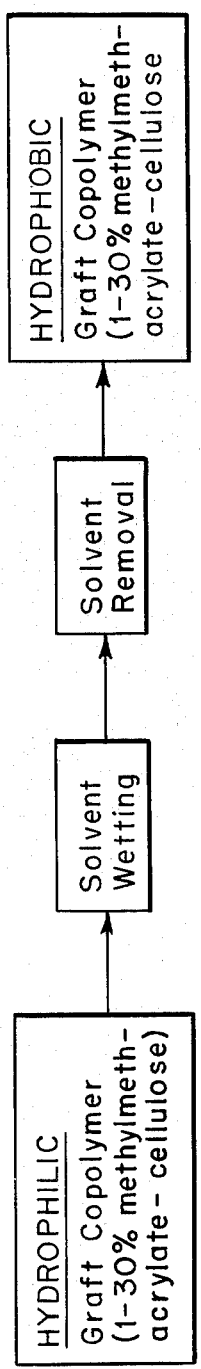
INVENTOR
Igor Sobolev

Igor Sobolev, Albany, Calif., assignor to Rayonier Incorporated, Shelton, Wash., a corporation of Delaware
Filed May 2, 1962, Ser. No. 191,712
9 Claims. (Cl. 162—157)

This invention relates to graft copolymers of cellulsoe, and has for its object the provision of an improved cellulose-methyl methacrylate graft copolymer and a process of producing the graft copolymer. The graft copolymer of the invention is characterized by having hydrophobic properties and because of this property products made from the graft copolymers have many important uses. The invention is concerned with the conversion of hydrophilic cellulose-methyl methacrylate graft copolymers into hydrophobic cellulose-methyl methacrylate graft copolymers (herein sometimes for convenience called "graft copolymers").

The invention is based on the discovery of a treatment process for rendering hydrophilic cellulose methyl methacrylate graft copolymers hydrophobic. In one aspect of the invention a hydrophilic cellulose methyl methacrylate graft copolymer is heated to a temperature above the glass transition temperature (Tg) of the polymethyl methacrylate polymer (105° C.). This heat treatment changes the properties of the product by making it impervious to water. In another aspect of the process of the invention, the same effect is obtained by treatment of the hydrophilic cellulose methyl methacrylate graft copolymer with a suitable solvent for methyl methacrylate polymer which does not swell cellulose. Without in any way attempting to premise the invention on any theory of what actually takes place in the process of the invention, the following is offered as a theoretical explanation.

In redox initiated aqueous graft polymerization processes of high grafting efficiency involving cellulose and methyl methacrylate, chain growth is initiated at activated sites on accessible surfaces (internal and external) of the cellulose fiber or film. Since polymer-polymer contacts will be favored over polymer-water contacts the grafted polymer chains appear to assume a tightly coiled configuration. With lower ratios of polymer to cellulose fiber, etc., the major portion of said cellulose is left exposed to water, etc. The coiled polymer chains remain in this coiled state during drying provided they are not heated above their glass transition temperature (Tg) which in this case is 105° C. Above (Tg), however, translational motion of polymer segments in the poly (methyl methacrylate) chains sets in and the coils thereof (attached at one end to the cellulose backbone) tend to straighten out and to fuse together at contact points between individual chains. This results in a network of hydrophobic chains of methyl methacrylate polymer over the cellulose fiber or film that resists penetration by water. Although a web of such fibers may contain up to about 30% polymer by weight it is still permeable to gases to the same extent as before heating above Tg.

The solvent treatment has about the same effect as heating above (Tg). In this case solvent molecules free the polymer-polymer contacts of the coiled polymer chains attached at one end to the cellulose backbone, permitting them to straighten out as in the case of heating. They then fuse together forming a network as before.

Polymethyl methacrylate is known to be inert to water and to have hydrophobic properties. It would be expected, therefore, that the copolymers prior to heat treatment or solvent treatment would have increased hydrophobic properties. Contrary to expectations, cellulose having up to 30 percent grafted methyl methacrylate polymer thereon absorbs about as much water as before grafting. It was surprising to find that the treatments of the invention on the cellulose methyl methacrylate graft copolymers changed the hydrophilic property to hydrophobic.

There are a number of presently known methods for graft polymerizing methyl methacrylate on to cellulose, for example the ceric ion initiator method of the American Cyanamid Company, a published cobaltic ion initiator method, and the method of my copending patent application Serial No. 155,493. Briefly the method of my application comprises treating cellulose having reactive sites along the chain, such as carboxyl, keto and aldehydic groups, in an aqueous system with methyl methacrylate in the presence of a complexed manganic ion initiator.

In the accompanying drawings—

FIG. 1 is a flow sheet illustrating the process in which the hydrophobic cellulose methyl methacrylate graft copolymer is formed and heated above the (Tg) temperature, and FIG. 2 is a flow sheet illustrating the process in which the hydrophobic cellulose methyl methacrylate graft copolymer is wet with a solvent.

In practicing the process of my invention any suitable form of cellulose may be used, such as wood pulp fibers, cotton linters, cotton yarns or fabrics, regenerated cellulose as fibers or sheets. The grafting is carried out to graft copolymerize from about 1 percent to about 30 percent of methyl methacrylate monomer on the cellulose by weight. When fibrous cellulose is used to form paper, wood pulp fibers are treated to form the graft copolymer and then the fibers are formed into paper and dried in the usual way. Similarly, graft copolymers of cotton linters may be formed into thread and woven into fabric. The hydrophilic paper or fabric, as the case may be, can be treated according to either variation of the invention to render it hydrophobic or water repellant. In subjecting the cellulose to the heat treatment this may be done in any suitable manner. When the grafted cellulose is made into paper, the paper is dried on the paper machine. In the drying operation care is taken to heat the paper above the glass transition temperature (Tg) which is above 105° C., the usual drying machine temperature for paper. What will be a suitable length of time in each case depends upon several inter-related factors, including the actual temperature used, the extent of the grafting and the nature of the cellulosic material. The temperature may range from about 110° C. to as high as can safely be used without damage to the cellulose, say 150–175° C. For times and temperatures that are both convenient and effective it is preferable to use temperatures ranging from about 135° to 150° C., and times ranging from about 10 to 180 minutes. The preferred degree of grafting may vary from about 1 to 30 percent and will depend upon the economics and the nature of the final product that is desired.

In the solvent treatment process of the invention, the cellulose is graft copolymerized with methyl methacrylate as described above and is dried but is not subjected to heat treatment. The copolymer is soaked in an excess of a non-swelling solvent for methyl methacrylate polymer, such as benzene, acetone, and chloroform, at any convenient temperature until the copolymer is completely saturated. Upon removal of the solvent as by evaporation the product will be found to have changed from a hydrophilic to a hydrophobic material.

The process of this invention provides products with a wide range of utility. They can be used to form papers of over-all good strength that have outstanding wet strengths. The thermal stability and color properties of such products are also greatly increased. The process can be used to produce water repellant cloth. Also, the grafting and subsequent heat or solvent treatments greatly increase the electrical resistance of the end products, thereby providing them with interesting possibilities in the electrical laminating and insulating fields.

The following examples illustrate processes of the invention for producing the improved cellulosic products of the invention:

EXAMPLE I

A sample of commercial, high-brightness, sulfite paper pulp prepared from western hemlock wood was divided into 6 portions and grafted with methyl methacrylate monomer using the initiator system disclosed in my copending patent application Serial No. 155,493, i.e., with a complexed manganic ion initiator. The samples were grafted in duplicate as follows: Air-dry pulp (250 gm. O.D. basis) was shredded and dispersed in two liters of water. The mixture in a closed vessel was evacuated several times and purged with nitrogen. Monomer (methyl methacrylate, 0.01% p-methoxyphenol inhibitor) and initiator (prepared by adding, in the order listed, 7.25 gm. sodium pyrophosphate, 5.0 ml. concentrated sulfuric acid, 2.21 gm. manganous sulfate and 0.403 gm. technical-grade potassium permanganate to 135 ml. deionized water) were then added with stirring. The amount of monomer added was varied as indicated in the tables but the amount of initiator was constant in all experiments. The reaction time was two hours. The temperature at the beginning of the reaction was 25° C. At the conclusion it varied from 31 to 35° C. Duplicate control runs were conducted without monomer exactly as above except 300 gr. pulp was used and a correspondingly larger amount of initiator chemical was used. At the conclusion of each run, the grafted pulp was immediately filtered, washed, treated with dilute sulfurous acid to remove adsorbed manganic ion, rewashed, and dried in a vacuum oven at 50° C., after being formed into standard handsheets.

Samples of the various grafted pulps and a control portion were fully beaten (freeness 170–240 ml.) and subjected to standard routine paper tests both before and after being aged at 135° C. in air. The results obtained from the parallel determinations are included in Table I.

Table I

|  | Sample A | | Sample B | | Sample C | |
|---|---|---|---|---|---|---|
| MMA monomer added, percent | None | | 5.0 | | 10.0 | |
| MMA polymer grafted, percent | Control | | 4.9 | | 7.6 | |
| Heat treatment | No | Yes | No | Yes | No | Yes |
| Mullen | 107 | 103 | 73 | 72 | 68 | 68 |
| Tear | 1.36 | 1.37 | 1.24 | 1.22 | 1.11 | 1.14 |
| Fold | 6 | 9 | 1 | 1 | 0.8 | 0.8 |
| Tensile (dry) | 6,580 | 7,180 | 4,940 | 5,120 | 4,670 | 5,290 |
| Tensile (wet) | 300 | 500 | 230 | 395 | 235 | 393 |
| Elect. resist., 50 V | 100 | 318 | 51 | 460 | 91 | 544 |
| Elect. resist., 500 V | 7 | 60 | 4 | 96 | 11 | 124 |
| Klemm absorbency, mm | 24 | 12 | 20 | 11 | 18 | 10 |

|  | Sample D | | Sample E | | Sample F | |
|---|---|---|---|---|---|---|
| MMA monomer added, percent | 15.0 | | 20.0 | | 30.0 | |
| MMA polymer grafted, percent | 12.4 | | 16.2 | | 21.6 | |
| Heat treatment | No | Yes | No | Yes | No | Yes |
| Mullen | 62 | 65 | 62 | 64 | 53 | 55 |
| Tear | 1.05 | 1.04 | 1.07 | 1.04 | 1.01 | 0.87 |
| Fold | 0.5 | 0.7 | 0.5 | 0.6 | 0.3 | 0.4 |
| Tensile (dry) | 5,150 | 5,025 | 4,660 | 5,150 | 4,710 | 4,530 |
| Tensile (wet) | 233 | 404 | 234 | 435 | 224 | 464 |
| Elec. resist., 50 V | 113 | 850 | 145 | 950 | 145 | 1,020 |
| Elec. resist., 500 V | 10 | 160 | 16 | 206 | 16 | 200 |
| Klemm absorbency, mm | 18 | 8 | 18 | 6 | 15 | 5 |

EXAMPLE II

Application of the heat treatment of this invention to a grafted pulp prior to its formation into a sheet yields a paper with impaired strength and electrical resistance properties. In the following table sample A is a control taken from the pulp without treatment. Samples B and C are portions of the same high-brightness sulfite paper pulp prepared from hemlock wood. They have been grafted by the process of the preceding example to contain 27 percent grafted methyl methacrylate. All three samples were beaten to a freeness between 369 and 400, then formed into handsheets, dried and tested. Sample A was dried at 50° C., in a vacuum oven, sample B was air dried, heated at 135° C., for 1 hour then slurried up, formed into a sheet and redried at 50° C. in a vacuum oven. Sample C was formed into sheets and dried at 50° C. in a vacuum oven in the same manner as A and then immediately given a supplemental heat treatment at 135° C. for one hour. The results follow in Table II.

Table II

| Sample | A | B | C |
|---|---|---|---|
| Mullen | 49 | 40 | 51 |
| Tear | 1.15 | 1.15 | 0.95 |
| Tensile | 3,820 | 3,390 | 4,570 |
| Electrical resistance, megohms at— | | | |
| 50 V | 410 | 424 | 4,760 |
| 500 V | 48 | 61 | 1,050 |
| Klemm absorption | 27 | 40 | 0 |

EXAMPLE III

In order for the heat treatment of the present invention to be effective in rendering a pulp sheet water repellant, about 2-4% methyl methacrylate polymer graft based on the weight of the cellulose was sufficient. For a kraft pulp approximately 6 to 9% was required. This is illustrated in the following table listing the results obtained when a southern pine kraft pulp and a western hemlock sulfite paper pulp were grafted by the process of Example 1 with the indicated amounts of methyl methacrylate and heated for 16 hours at 120° C.

*Table III*

| Type of Pulp | Polymer Content, percent | Klemm Absorptivity, mm. | | | |
|---|---|---|---|---|---|
| | | 5 min. | 15 min. | 45 min. | 180 min. |
| Sulfite | 0 | 5 | 28 | 35 | 39 |
| Kraft | 0 | 12 | 19 | 28 | 30 |
| Sulfite | 1 | 2 | 5 | 8 | 10 |
| Kraft | 2 | 9 | 14 | 17 | 20 |
| Sulfite | 4 | 0 | 0 | 0 | 0 |
| Kraft | 6 | 1 | 3 | 4 | 5 |
| Do | 9 | 0 | 0 | 0 | 0 |
| Do | 24 | 0 | 0 | 0 | 0 |
| Sulfite | 26 | 0 | 0 | 0 | 0 |

EXAMPLE IV

The effectiveness of a solvent treatment when applied to a cellulose methyl methacrylate graft copolymer in inducing hydrophobic properties is illustrated by this example. Some of the vacuum dried handsheets used as sample A in Example II were saturated with benzene (which is a solvent for the homopolymer) by immersion therein for a few minutes. They were then removed and air-dried at room temperature. These solvent treated handsheets were then given standard paper tests with the results indicated in the following table.

*Table IV*

| | No Solvent Treatment | Solvent Treated |
|---|---|---|
| Dry mullen | 49 | 51 |
| Tear | 1.15 | 1.06 |
| Fold | 0.4 | 0.3 |
| Dry tensile | 3,820 | 4,310 |
| Electrical resistance at— | | |
| 50 V megohms | 410 | 750 |
| 500 V megohms | 48 | 140 |
| Klemm absorptivity, mm | 27 | 0 |

From these results it is apparent that water repellancy was obtained without deleterious effects on the other properties of the paper.

All of the tests used in the foregoing examples were run by the standard Tappi methods except the so-called "Klemm" test for absorbency. In the Klemm test strips of paper were dipped below the surface of water (at 20° C.) and the capillary rise of the water therein was measured at various intervals of time. The more hydrophilic the material, the faster and farther the water rises on the sheet.

I claim:

1. The process of producing hydrophobic cellulose methyl methacrylate graft copolymers which comprises heating a hydrophilic cellulose methyl methacrylate graft copolymer containing from 1 to 30 percent methyl methacrylate polymer to a temperature above 105° C. for 10 to 180 minutes.

2. The process of producing hydrophobic cellulose methyl methacrylate graft copolymers which comprises heating a hydrophilic cellulose methyl methacrylate graft copolymer to a temperature above the (Tg) temperature of the methyl methacrylate polymer.

3. The process of producing hydrophobic cellulose methyl methacrylate graft copolymers which comprises wetting a hydrophilic cellulose methyl methacrylate graft copolymer containing from 1 to 30% by weight of methyl methacrylate with a solvent for the methyl methacrylate polymer of the group consisting of acetone, benzene, chloroform and carbon tetrachloride, and then removing the solvent as by evaporation.

4. The process for improving the properties of cellulosic fibers which comprises grafting on the cellulose of the fibers a methyl methacrylate polymer forming hydrophilic cellulose methyl methacrylate graft copolymer, forming the grafted fibers into a sheet, drying the sheet, and wetting the cellulose methyl methacrylate graft copolymer with a solvent of the group consisting of acetone, benzene, chloroform and carbon tetrachloride to form hydrophobic cellulose methyl methacrylate graft copolymer.

5. In the process of claim 4 grafting from 1 to 30% by weight of methyl methacrylate on the cellulose.

6. The process for improving the properties of cellulose fibers which comprises grafting on the cellulose of the fibers from 1 to 30% by weight of a methyl methacrylate polymer, forming the hydrophilic grafted fibers into a sheet, drying the sheet, wetting the sheet with an organic solvent for the methyl methacrylate polymer of the group consisting of acetone, benzene, chloroform and carbon tetrachloride, and evaporating the solvent rendering the sheet hydrophobic.

7. The process of forming improved paper which comprises grafting onto cellulose fibers methyl methacrylate polymers in an amount varying from 1 to 30% by weight, forming the fibers into a sheet of paper, and heating the sheet to a temperature above the Tg temperature for the methyl methacrylate polymer but not above 175° C. to impart hydrophobic properties to the paper.

8. The process of claim 4 wherein the cellulose fibers are wood pulp fibers and paper is formed therefrom.

9. The process of claim 2 wherein the hydrophilic cellulose methyl methacrylate graft copolymer was formed from cotton fabric.

References Cited by the Examiner

UNITED STATES PATENTS

| 2,784,052 | 3/1957 | Jacobson. | |
| 2,901,813 | 9/1959 | Schappel | 260—17.4 X |
| 2,922,768 | 1/1960 | Mino | 260—17.4 |
| 2,956,899 | 10/1960 | Cline. | |
| 3,065,041 | 11/1962 | Suen. | |
| 3,073,667 | 1/1963 | Bonvicini. | |
| 3,081,143 | 3/1963 | Segro. | |

FOREIGN PATENTS

| 582,773 | 9/1959 | Canada. |

DONALL H. SYLVESTER, *Primary Examiner.*

MORRIS O. WOLK, *Examiner.*